United States Patent Office 3,219,566
Patented Nov. 23, 1965

3,219,566
CROSS-LINKING OF POLYETHYLENE AND POLYPROPYLENE BY ULTRAVIOLET IRRADIATION IN THE PRESENCE OF ANTHRONE
Willis John Potts, Jr., Midland, Mich., and Charles R. Pfeifer, Newport News, Va., assignors to The Dow Chemical Company, Midland, Mich., a corporation of Delaware
No Drawing. Filed Feb. 15, 1962, Ser. No. 173,351
3 Claims. (Cl. 204—162)

This invention relates to the cross-linking of polymeric materials such as polyethylene and polypropylene by ultraviolet irradiation in the presence of an improved sensitizer.

It is well known in the art that cross-linking in polymeric materials reduces the thermoplasticity and decreases the solubility of the material. As the degree of cross-linking is increased the polymer first becomes insoluble but highly swellable, then the swellability is reduced in proportion to the number of cross-links. Generally if such cross-links are numerous, the polymer is non-swellable. Also polymeric materials having a high degree of cross-linking maintain their shape and do not soften when they are heated to temperatures considerably higher than the temperature at which otherwise similar but uncross-linked materials begin to flow.

It has been proposed to decrease the thermoplasticity and solubility of polymeric materials by blending polymers, which are essentially saturated, with certain ketones (particularly benzophenone, acetone and benzoin) and then exposing the blend to a concentrated artificial source of ultraviolet light. This process has been described in United States Letters Patent 2,484,529. The most effective sensitizer for the cross-linking of polyethylene which has been revealed is benzophenone. [See Gerald Oster, Gesela K. Oster and Harold Moroson, Journal of Polymer Science 34 671 (1959).]

It is an object of this invention to provide a more effective sensitizer for the cross-linking of polymers of ethylene and propylene, especially polyethylene, polypropylene, and ethylene-propylene copolymers, by ultraviolet irradiation. Other objects will be evident from the following description.

It has been found that, quite unexpectedly, anthrone is an unusually effective sensitizer. Comparative data are shown in Table I, infra.

The amount of anthrone which is used is not narrowly critical. Anthrone in amounts greater than about 10 percent of the weight of the polymer would seldom, if ever, be used; generally less than 2 percent and very often, somewhat less than 1 percent is preferred. In one embodiment, the anthrone is brought into intimate contact with the polymer by dissolving the anthrone in a suitable solvent such as methylene chloride; this solution is mixed with the powdered polymer; the resulting mixture is stirred until most of the solvent has evaporated. Other suitable methods for incorporating anthrone into the polymer may be used such as by blending the materials on a roll mill.

If only surface cross-linking of formed articles is desired, then the thickness of the polymer is not critical and the anthrone need be brought only in intimate contact with the surface such as by dipping into a solution of anthrone in a suitable solvent as, for example, methylene chloride, and the amount of anthrone required is related to the portion of the polymer which is cross-linked and not to the total mass of the polymer.

The polymers for the practice of this invention comprise the polymers and copolymers of ethylene and propylene. The art of the preparation of these polymers is well known and need not be described herein.

For the practice of this invention, any artificial source which produces ultraviolet light in the wavelength range from about 200 millimicrons to about 300 millimicrons may be used, for example, a low pressure mercury vapor resonance lamp contained in a quartz envelope. Suitable filtering media such as are well known in the art may be utilized to insure that a substantial portion of radiation reaching the polymeric composition is within the desired range, particularly when higher intensity sources are used. The length of exposure may be varied from 1 second to several hours, depending upon the source and intensity of ultraviolet light and the amount of sensitizer used, as well as the amount of cross-linking desired.

The temperature at which the irradiation process is carried out is not critical. It can range from below room temperature to temperatures somewhat above the melting point of the starting polymer. It is usually convenient to carry out the irradiation at ordinary room temperatures.

The following example is given as an illustration and is not for the purpose of limitation.

EXAMPLE

Twenty grams of powdered, high molecular weight, high density polyethylene was added to a solution of 100 mg. of anthrone in methylene chloride; the resulting slurry was stirred until all the methylene chloride had evaporated; the polymer (now containing 0.5 percent of anthrone admixed) was compression molded to a film approximately 3 mils thick, then irradiated for ten minutes with a 4-watt low-pressure germicidal lamp at a distance of less than 5 cm.

A weighed portion of the polymer which was thus cross-linked was heated in excess decahydronaphthalene at 140° C. for 4 hours, filtered hot through a previously weighed Gooch crucible, washed and dried; then the decahydronaphthalene insolubles were weighed. The degree of cross-linking is proportional to the percent insolubles. Three additional twenty-gram portions of the same lot of polyethylene were processed in the same manner. The percent insolubles are shown below in Table I in order to facilitate comparison with results obtained in the absence of this invention.

Four twenty-gram portions of the same lot of polyethylene as used in the example were irradiated with ultraviolet light in the same manner as in the examples of the invention except that benzophenone was substituted for the improved sensitizer of this invention. The percent insolubles from the four runs are shown in Table I. Two additional twenty-gram portions of the same lot of polyethylene were irradiated with ultraviolet light in the same manner but in the absence of any sensitizer. These results are shown also in Table I.

Table I.—*Ultraviolet irradiation of high density polyethylene*

| Sensitizer [1] | Percent of Insolubles | | | |
|---|---|---|---|---|
| | Run No. 1 | Run No. 2 | Run No. 3 | Run No. 4 |
| Anthrone | 45.0 | 40.9 | 50 | 43 |
| Benzophenone | 28.6 | 16.7 | 20 | 27 |
| None | 0.75 | 1.3 | | |

[1] The amount of sensitizer was 0.5 percent of the weight of the polyethylene used.

In place of the polyethylene used in the foregoing example there can be used other polymers of ethylene, polymers of propylene and copolymers of ethylene and propylene with substantially the same results.

The utility of cross-linked polyethylene and like polymers is known to those skilled in the art. By the practice of this invention such cross-linked polymers may be obtained in shorter time and/or with lower power requirements in ultraviolet radiation resulting in better production economics. Conversely, if desired, a greater degree of cross-linking can be obtained in the same time schedule. The practice of this invention is particularly adapted to films and fibers but also is applicable to extruded coatings, tubing, molded articles, tapes, and the like.

The production of cross-links by the method of this invention is especially advantageous in partially crystalline polymers. The type of cross-linking contemplated by this invention adds strength to the non-crystalline regions and leaves the crystalline regions essentially unaffected.

Having described the invention, what is claimed is:

1. In the process of cross-linking a polymer selected from the group consisting of the polymers and copolymers of ethylene and propylene, the improvement comprising decreasing the thermoplasticity and solubility of said polymer by exposing said polymer to ultraviolet light in the presence of anthrone until the polymer shows substantially increased resistance to organic solvents in which it was soluble before being subjected to said process.

2. The process of claim 1 in which the ultraviolet light employed has a wavelength between 200 and 300 millimicrons.

3. The process of claim 1 in which the polymer is polyethylene.

References Cited by the Examiner

UNITED STATES PATENTS

| | | | |
|---|---|---|---|
| 2,484,529 | 10/1949 | Roedel | 204—162 |
| 3,014,799 | 12/1961 | Oster | 204—162 |

MURRAY TILLMAN, *Primary Examiner.*

J. R. SPECK, *Examiner.*